Aug. 19, 1952  W. D. ALLISON  2,607,611
MOTOR VEHICLE SPRING SUSPENSION
Original Filed April 12, 1944  4 Sheets-Sheet 2
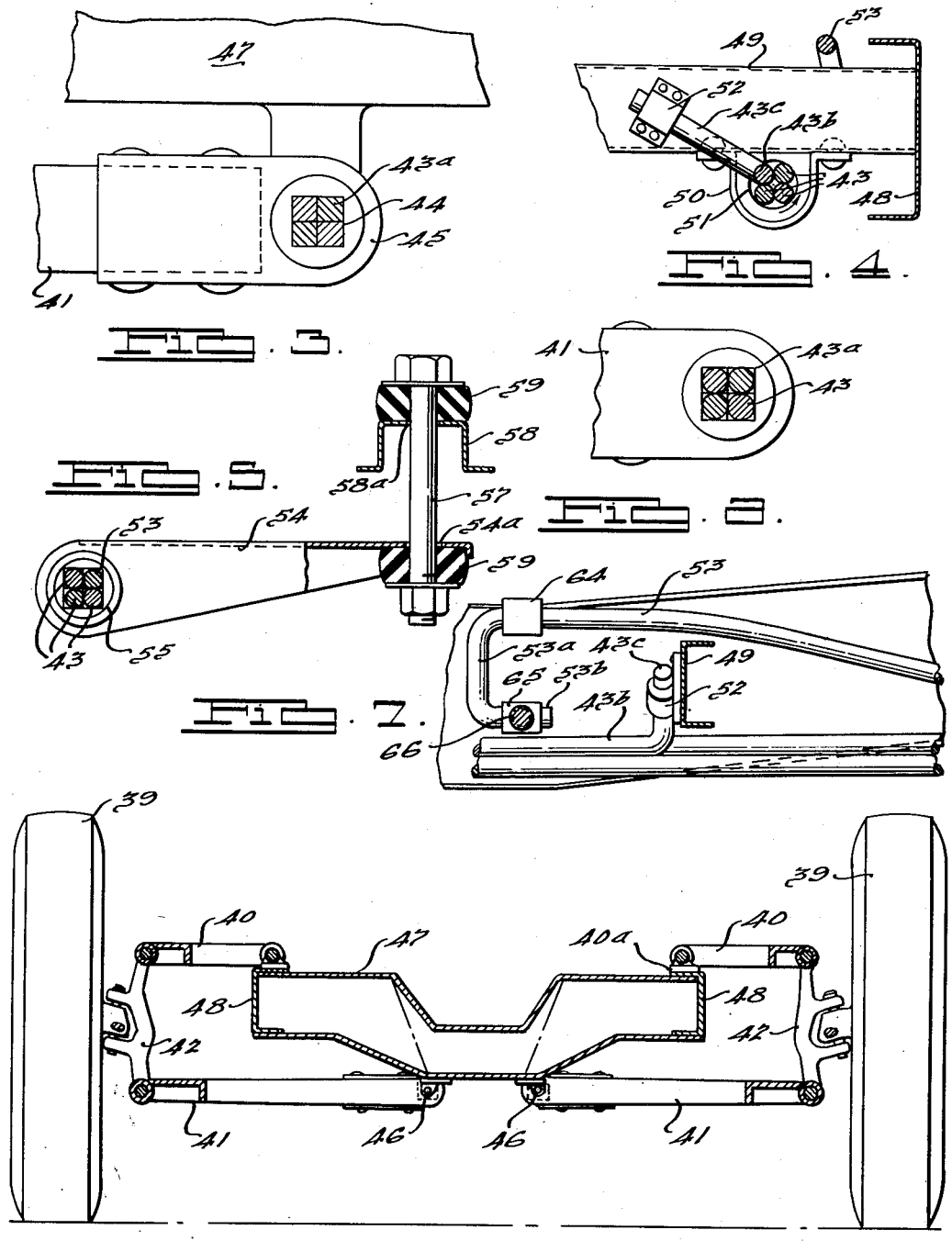
INVENTOR
William D. Allison.
BY
George & Smith
ATTORNEYS.

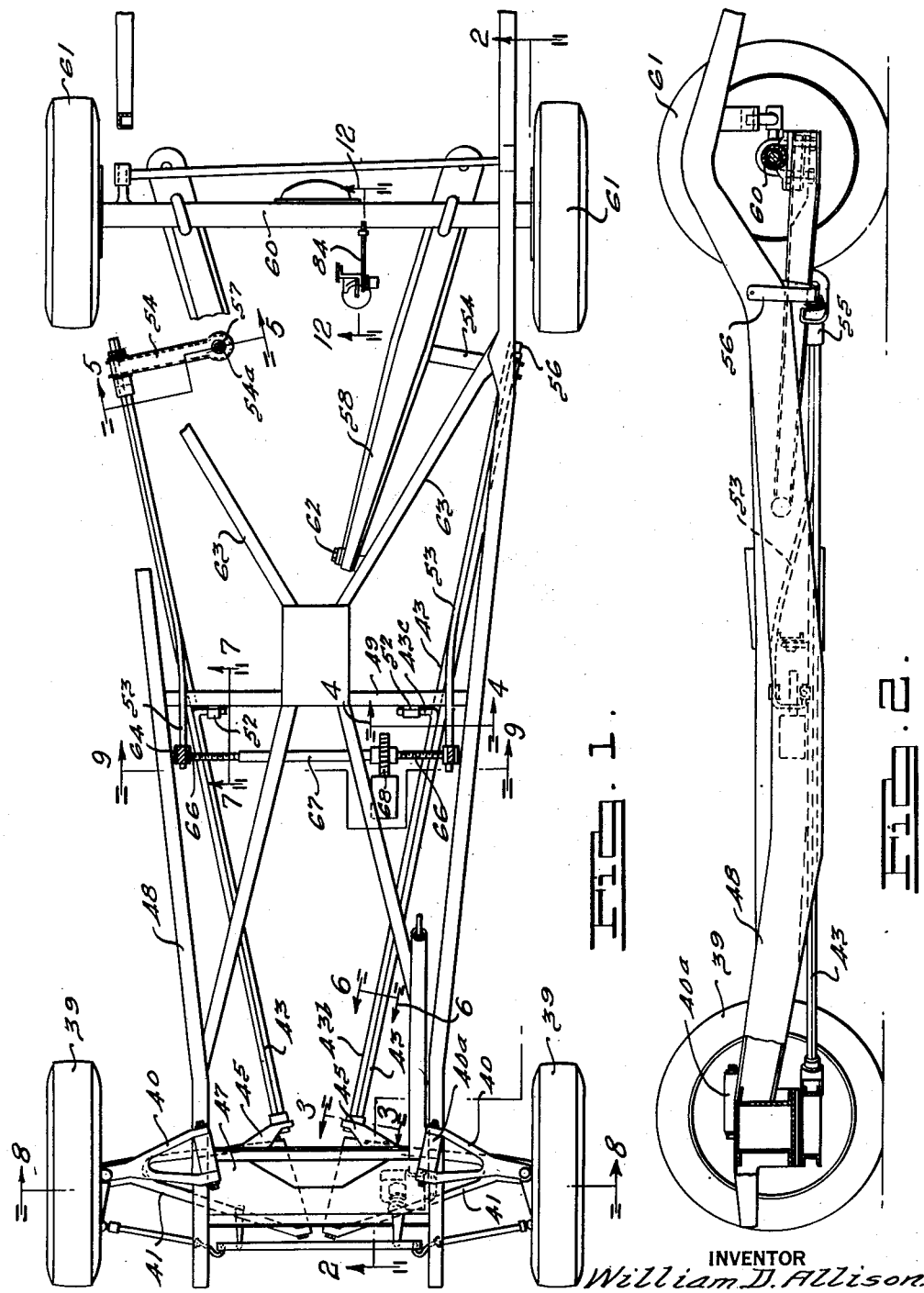

Aug. 19, 1952 W. D. ALLISON 2,607,611
MOTOR VEHICLE SPRING SUSPENSION
Original Filed April 12, 1944 4 Sheets-Sheet 3

INVENTOR
William D. Allison.
BY Gray & Smith
ATTORNEYS.

Aug. 19, 1952      W. D. ALLISON      2,607,611

MOTOR VEHICLE SPRING SUSPENSION

Original Filed April 12, 1944      4 Sheets-Sheet 4

INVENTOR
William D. Allison.
BY
George Smith
ATTORNEYS.

Patented Aug. 19, 1952

2,607,611

UNITED STATES PATENT OFFICE 2,607,611

MOTOR VEHICLE SPRING SUSPENSION

William D. Allison, Grosse Pointe, Mich.

Continuation of application Serial No. 530,661, April 12, 1944. This application June 27, 1947, Serial No. 757,579

19 Claims. (Cl. 280—104)

This invention relates to motor vehicles and more particularly to spring suspensions therefor. Although the present invention has been illustrated herein as embodied in an automobile of the pleasure or passenger type it will be understood that the invention is equally applicable to other types of motor vehicles, such as busses, ambulances and commercial vehicles.

One of the principal objects of the present invention is to provide a spring suspension for a motor vehicle capable of improving the riding characteristics of the vehicle, increasing the comfort of the driver and passengers especially when the vehicle travels over rough roads, and rendering the vehicle safer to handle over rough terrain while reducing materially serious stresses to which the frame is subjected in the use of motor vehicles having conventional spring suspensions.

A further object of the invention is to provide an improved spring suspension for a motor vehicle which will materially reduce and, in fact, largely eliminate pitching, tossing and side sway of the vehicle and greatly reduce body shake and vibration when the vehicle is travelling over rough roads.

Another object of the invention is to provide a spring suspension utilizing much softer or lower rate springs than heretofore, thereby improving the riding qualities of the vehicle, while at the same time providing automatic means for varying the rate or resistance of the springs in order to compensate for varying loads. As a result of this feature of the invention it is possible to maintain the average effective riding height of the vehicle body substantially constant within the range of the load capacity of the springs regardless of whether the vehicle is empty or whether varying loads are carried thereby.

Still another object of the invention is to provide a motor vehicle having an improved spring suspension embodying springs which are common to the front and rear of the vehicle, the improved construction being such that when either a front or rear wheel passes over a change in elevation, producing a raising or lowering effort at one end of the vehicle, a simultaneous and similar raising or lowering effort is applied at the opposite end of the vehicle. Thus, by virtue of the invention vertical forces, such as lifting forces transmitted from the wheels to the chassis, are divided between the front and rear wheels due to their cooperative action on the springs which are mutually common to the front and rear wheels. In short the action of the present spring suspension results in the simultaneous application of substantially equivalent vertical forces at opposite ends of the chassis and body whenever the wheel or wheels at one end of the vehicle pass over a change in elevation. As a consequence, the vehicle rides with a substantially level travel and pitching and side sway of the vehicle are greatly minimized.

A further object of the invention is to provide a spring suspension for a motor vehicle embodying at each side of the vehicle a torsion bar spring or springs common to the front and rear wheels and connected thereto through the medium of mechanism in the form of lever arm means effective to cause both the front and rear wheels at the same side of the vehicle to deflect the same torsion bar spring or springs when either wheel passes over a change in elevation, such mechanism also being constructed to exert corresponding efforts or forces in a vertical direction on opposite ends of the vehicle chassis or body so that the latter will ride on a more nearly even keel without appreciable pitching or tossing when the vehicle is driven over rough terrain.

A further object of the invention is to provide an improved spring suspension embodying torsion spring bars extending longitudinally of the vehicle and connecting front and rear wheels at the same side of the vehicle through the medium of levers connected in opposed relation to the torsion bars and frame or axle assemblies, the construction being such that torsional deflection of the bars by vertical motion of a rear wheel or wheels accompanied by a vertical motion of the rear end of the vehicle will cause the bars to transmit a corresponding motion to the front end of the vehicle and vice versa.

Another object of the invention is to provide what may be termed a balanced spring suspension for a motor vehicle, this being accomplished by providing longitudinal torsion bar spring means connecting through the medium of opposed front and rear lever arm means a pair of front and rear wheels at each side of the vehicle, and in addition providing spring means, preferably torsion bar spring means, connected to one wheel, such as the rear wheel, and independent of the other wheel for increasing the spring resistance at one end of the vehicle so as to compensate for varying load conditions and thereby maintain the vehicle substantially level.

Other objects of this invention will appear in the following description and appended claims, reference being had to the accompanying drawings forming a part of this specification wherein like reference characters designate corresponding parts in the several views.

Fig. 1 is a fragmentary plan view of a motor vehicle, the body or superstructure thereof being omitted for the sake of clearness, illustrating one embodiment of the invention.

Fig. 2 is a longitudinal sectional elevation taken substantially through lines 2—2 of Fig. 1 looking in the direction of the arrows.

Fig. 3 is an enlarged section taken substantially through lines 3—3 of Fig. 1 looking in the direction of the arrows.

Fig. 4 is an enlarged section taken substantially through lines 4—4 of Fig. 1 looking in the direction of the arrows.

Fig. 5 is an enlarged section taken substantially through lines 5—5 of Fig. 1 looking in the direction of the arrows.

Fig. 6 is an enlarged section taken substantially through lines 6—6 of Fig. 1 looking in the direction of the arrows.

Fig. 7 is an enlarged section taken substantially through lines 7—7 of Fig. 1 looking in the direction of the arrows.

Fig. 8 is an enlarged section taken substantially through lines 8—8 of Fig. 1 looking in the direction of the arrows.

Figure 9:
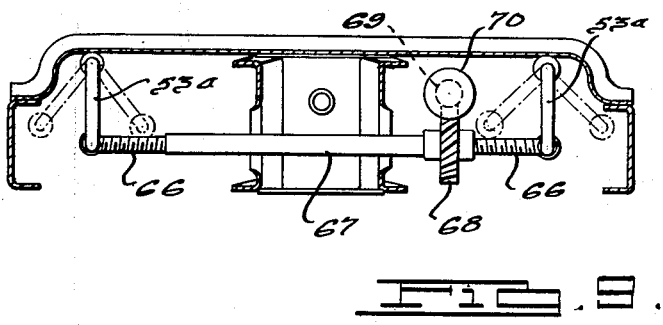
Fig. 9 is an enlarged section taken substantially through lines 9—9 of Fig. 1 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

This application is a continuation of my application Ser. No. 530,661, filed April 12, 1944, now abandoned.

The term "axle assembly" or "axle means," as used herein, is intended to comprehend any of the usual types of wheel supports such as a solid axle connecting either the front wheels or the rear wheels or swinging wheel supporting arms of the general type conventionally used in so-called independent wheel suspensions.

In Figs. 1 to 9 inclusive there is illustrated an automobile chassis and running gear structure in which the body or superstructure has been omitted for the sake of clearness. This vehicle represents one conventional type in which the front wheels 39 are supported for vertical movement by independent axle assemblies of the type utilizing upper and lower swinging arms 40 and 41, respectively. In the particular vehicle shown in this embodiment the rear wheels 61 are connected by a solid axle 60, although it will be understood that the rear wheels may be supported by independent axle assemblies such as those provided for the front wheels. As more clearly shown in Fig. 8, each front wheel 39 is supported by upper and lower short and long lever arms 40 and 41 of wish-bone construction connected together at their outer ends by a spindle and king pin mounting 42 of any conventional type. The inner bifurcated ends of each upper arm are journalled in a bracket 40a secured to the top of the chassis frame. The springs for the vehicle comprise two clusters of torsion bars, one at each side of the chassis extending longitudinally thereof. Since, as shown in Fig. 1, the torsion bar spring mechanism and associated parts are duplicated at each longitudinal side of the vehicle, a description of one thereof will suffice. At the front of the vehicle a set or cluster of torsion bars 43 is connected to each of the lower swinging wheel supporting arms 41. These bars are preferably round bars and are formed of spring steel, and as shown in Figs. 3 and 6 the front terminal ends 43a thereof are squared to fit snugly into a square hole or socket 44 in a bracket 45 rigidly secured as by riveting to the inner end of each wheel supporting arm 41. The socket 44 and hence the central longitudinal axis of the cluster of torsion bars 43 extends in line with the axis of swinging 46 of the wheel supporting arm 41, each of these arms being pivoted, as shown in Figs. 3 and 8, to the bottom of the front cross-frame member 47 which is rigidly secured at its ends to the longitudinal chassis or sill frame members 48. From this construction it will be readily seen that swinging motion of the arms 41 about their axes 46 will produce swinging or angular motion of the brackets 45 and, hence, will produce a torsional or twisting action on the front ends of the torsion bars 43. Thus, vertical movements of the front wheels 39 will be resisted by the torsional resistance of the spring torsion bars 43.

The chassis side sills 48 are rigidly connected together intermediate the front and rear wheels by a cross-frame member 49. Secured to the bottom of this frame member at each side thereof is a bracket 50 having a hole or socket 51 through which three of the torsion bars of each set 43 pass to the rear end of the vehicle. Each bracket 50, therefore, provides a guide for three of the torsion bars which extend continuously from the front to the rear of the vehicle. The forth torsion bar 43b of each set or cluster, which is connected in the socket 44 of the bracket 45, terminates at the cross-frame member 49, and as illustrated in Figs. 1, 4 and 7 this fourth torsion bar 43b has an angularly bent crank extension 43c which is anchored in a socket 52 of a bracket riveted to the front face of the frame member 49.

The three torsion bars 43 of each set or cluster, which pass through the socket 51 and continue from the cross-frame member 49 to the rear of the vehicle, are supplemented for the purpose of springing the rear wheels and providing means for compensating for varying loads by an additional torsion bar 53 at each side of the vehicle. The two spring torsion bars 53 function, as hereinafter described, as load compensating bars and they terminate somewhat in advance of the cross-frame member 49, as illustrated in Figs. 1 and 7.

As illustrated in Fig. 5, the rear terminal ends of the three torsion bars 43 and the compensating torsion bar 53 of each set or cluster are squared and fit snugly into a square socket in a socket member 55 secured to the outer end of a swinging lever 54. The outer end of this lever is carried in fixed position by a hanger bracket 56 secured to one of the frame members 48, the lever being journalled in the bracket so as to turn about an axis coincident with the central longitudinal axis of the cluster of four bars 43 and 53. The inner end of each swinging lever 54 is connected by a vertically extending bolt 57 to one of a pair of torque arms or radius bars 58. Each bolt 57 extends through apertures 54a and 58a in the members 54 and 58. The connection between the bolt 57, the lever 54 and torque arm 58 includes resilient rubber grommets or pads 59 which permit limited relative movement of the parts during swinging motion of the lever and torque arm. Each torque arm or radius bar 58 is connected in the usual manner to the rear axle 60 which carries the rear wheels 61. The forward ends of the torque arms are pivotally connected at 62 to two members 63 of the reinforcing X frame of the vehicle which in turn are connected in conventional manner to the side sills 48.

From the foregoing construction it will be seen that vertical movement of either rear wheel 61 will be transmitted through the axle 60 to one or the other of the torque arms 58 which swing about the pivots 62. Vertical swinging motion of either torque arm will swing one or the other of the levers 54, thereby torsionally twisting the rear ends of the cluster of torsion bars comprising the three bars 43 and the compensating bar 53. It will be further seen from the construction thus described that the three torsion bars 43 of each set or cluster connect one front wheel with one rear wheel at one side of the vehicle, as a result of which a twist or torsional deflection imparted at one end of these bars will be transmitted to the opposite end, and this torsional deflection will result in the bars exerting forces in corresponding vertical directions on the frame at opposite ends thereof.

It will be noted that each longitudinal torsion bar spring means 43 connects a front wheel and a rear wheel at the same side of the vehicle and that the front lever arm 41 extends outwardly from its connection to the torsion bar spring means whereas the rear lever arm 54 extends inwardly from its connection to the torsion bar spring means. Inasmuch as the lever arms 41 and 54 for the front and rear wheels respectively extend from the front and rear of the torsion bar spring means 43 in opposed or opposite directions, it will be seen that said lever arms will be effective to torsionally deflect opposite ends of the torsion bar spring means in opposite directions in response to vertical motion of the front and rear wheels in corresponding directions. Thus, the torsion bar spring means will be effective through the lever arms for the front and rear wheels to transmit vertical forces in corresponding directions to the front and rear of the frame in response to vertical motion of either wheel.

It will also be noted that the torsion bar spring means 43 for the pairs of front and rear wheels diverge outwardly toward the rear of the vehicle so that the connection between each rear lever arm 54 and its associated torsion bar spring means is spaced outwardly from the longitudinal center line of the vehicle a greater distance than the spacing outwardly from said center line of the connection between the front lever arm 41 at the same side of the vehicle and its associated spring means. This construction has the advantage of improving materially the stability of the vehicle as well as increasing the resistance of the spring mechanism to body roll, especially when the vehicle travels on curves in the highway.

As illustrated particularly in Figs. 1 and 7, the forward end of each compensating torsion bar 53 is guided for turning movement in a socket or bracket 64 secured to the frame. The end of each bar 53 has a downward crank extension 53a terminating in a return bent end portion 53b mounted within a coupling collar 65 on the threaded end member 66 of a turnbuckle shaft 67. The ends of this shaft are tapped to receive the threaded end members 66 which may be shifted endwise relative to the shaft upon rotation of the latter. Secured to the shaft 67 is a worm gear 68 meshing with a pinion 69 on the armature shaft of an electric motor 70 suitably carried by the frame of the vehicle for limited vertical movement to compensate for the arcs through which the ends of the crank arms 53a move when adjusted by operation of the turnbuckle. The motor is of the reversible type adapted to be operated to shift the turnbuckle end members 66 outwardly and inwardly, such movement imparting corresponding swinging motion to the crank extensions 53a of the compensating torsion bars 53 resulting in increasing or decreasing the torsional deflection or twist thereof which in turn is transmitted to the lever arms 54, thereby causing a change in load resistance at the rear end of the vehicle of the spring suspension to compensate for load changes.

Figure 10:
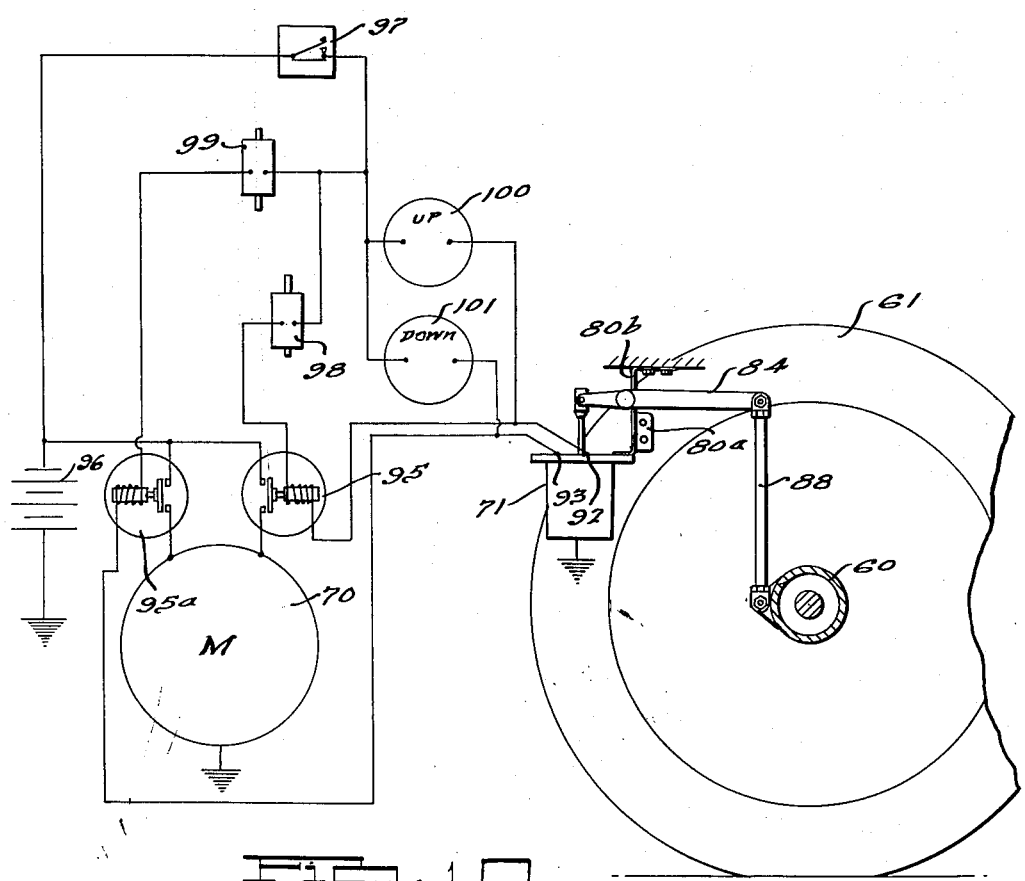
Fig. 10 is a view illustrating principally the wiring diagram for the load compensator.
Figure 11:
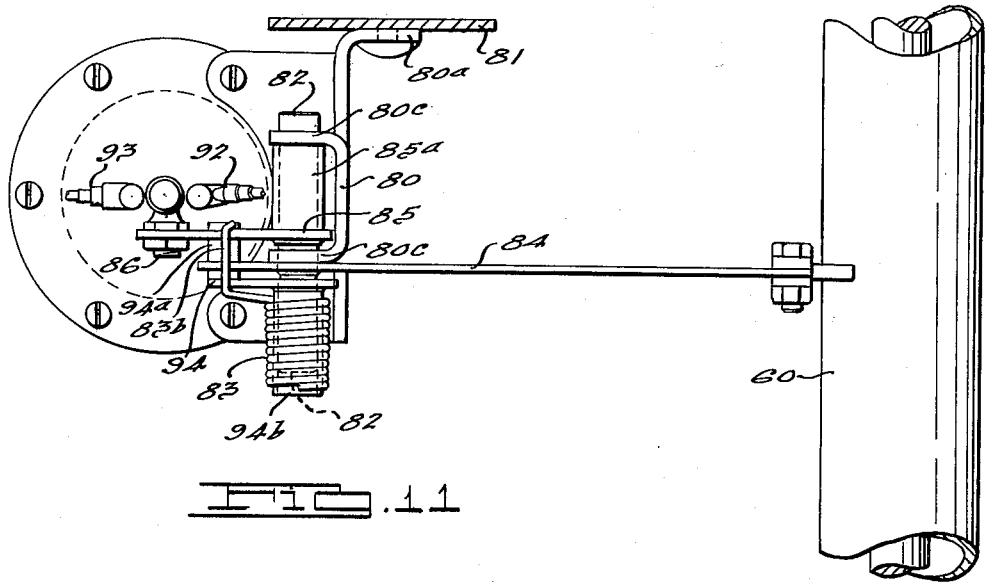
Fig. 11 is a plan view of the construction shown in Fig. 12.
Figure 12:
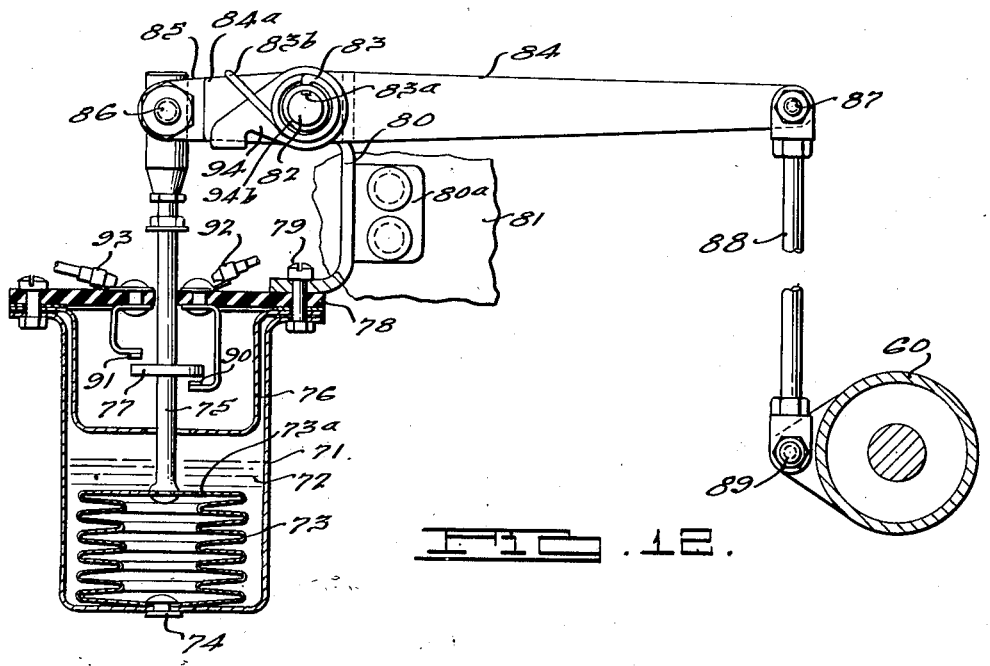
Fig. 12 is an enlarged section taken substantially through lines 12—12 of Fig. 1, this view illustrating particularly the delayed action switch for the load compensator, the wiring diagram of which is shown in Fig. 10.

As illustrated in Figs. 10 to 12 inclusive, provision is made for operating the load compensating motor 70 in one direction or the other in order to increase or decrease the total load resistance of the spring suspension at the rear of the vehicle so as to compensate for increases or decreases in the pay load, such means being constructed, however, so as not to be influenced by mere temporary changes or by vertical motion of the rear wheels and the rear axle 60 during travel of the vehicle. The load compensating mechanism will only operate after a predetermined delay or interval of time, as it is only desirable that this occur when the pay load of the vehicle is increased or decreased over a relatively long period of time.

In Figs. 10 to 12 inclusive there is illustrated a delayed action switch and wiring diagram for operating the motor 70 after a change in average height of the chassis and body has continued for a given period of time. This switch mechanism includes a dash pot 71 containing a body of liquid, such as oil 72, within which an expansible and collapsible bellows 73 is immersed. The bottom of the bellows is electrically connected to a contact 74 which is suitably grounded. Attached to the top of the bellows is a plunger 75 extending freely through an aperture in a shield 76 secured within the upper end of the dash pot above the level of liquid. The plunger or rod 75 carries a contact disk 77 and the top of the dash pot is closed by means of a cover 78 of non-conducting or insulating material. The dash pot is bolted or fastened at 79 to the lower inturned end of a bracket 80 rigidly secured by means of a flange 80a to a portion 81 of the body or frame of the vehicle. As illustrated in Fig. 10, an additional supporting bracket 80b secured to the floor of the vehicle may be provided. Thus, the entire dash pot mechanism is susceptible to vertical motion of the vehicle body and chassis. The bracket 80 is provided with spaced ears 80c within which is journalled a shaft 82. Free to turn on the shaft is a bushing 85a to which is secured a projecting crank arm 85. Also free to turn on the shaft is a bushing 94b to which is secured a projecting crank arm 94, this bushing extending beyond the end of the shaft. To the end of the bushing is anchored one end 83a of a spiral spring 83. The other end 83b is bent to extend over the end 84a of an operating lever 84 rigidly secured to the shaft 82. The bent end 83b of the spring is also extended to engage the upper edge of the crank arm 85, the outer end of which is pivotally connected at 86 to the upper end of the plunger 75. The crank arm 94 has a projection 94a underlying and in normal engagement with the lever 84 and crank arm 85. The rear end of the operating lever 84 is pivotally connected at 87 to the upper end of a rod or bar 88, the lower end of which is pivotally connected at 89 to a bracket secured to the rear axle 60.

Fastened to the underside of the dash pot cover 78 are a pair of vertically spaced contact members 90 and 91. These members overlap and underlie the contact disk 77 and are normally spaced a predetermined distance therefrom, as shown in Fig. 12. The contact members 90 and 91 are connected by means of rivets passing through the cover 78 to a pair of electrical conductors 92 and 93. The Sylphon or bellows 73 is provided with a bleed orifice 73a of predetermined restricted size to delay or slow down, as desired, the flow of liquid into and out of the bellows when the latter is expanded or collapsed by the vertical movement in one direction or the other of the plunger 75. It will be seen that pivotal motion of the operating lever 84 in either direction will be transmitted to the lever 85 through the medium of the spring 83, the downward effort of the lever being exerted by the spring end 83b and the upward effort by the projection 94a. Vertical movement of the plunger 75 consequent to swinging motion of the lever 85 will be resisted by the restricted flow of liquid through orifice 73a into or out of the bellows. Thus, ordinary short interval changes in the relative positions of the rear axle 60 and vehicle body or chassis will be resisted sufficiently by the bellows so that merely a deflection of the spring 83 will result and the contact disk 77 will not move vertically a sufficient distance to make contact to engage either the contact 90 or the contact 91. Any desired delay in starting the compensating motor can be obtained by varying the size of orifice 73a and the distance of the contact disk 77 from the contacts 90 and 91.

The construction and operation are, therefore, such that a change in load and the consequent change in the relative vertical positions of the axle and chassis must, in order to result in a contact being made between disk 77 and contact 90 or 91, continue for a long enough period of time to enable a predetermined quantity of liquid to be forced through the orifice 73a permitting contraction or expansion of the bellows a sufficient amount to enable the plunger 75 to travel a distance causing the gap between the contact disk and contact to be closed.

The wiring diagram illustrated in Fig. 10 will be readily understood and, briefly, comprises electric conductors and circuit means by which the motor 70 may be operated in either direction to operate the turnbuckle shaft 67. The conductors 92 and 93 are wired to a pair of solenoids 95 and 95a, the solenoid 95 controlling operation of the motor to exert an elevating action on the chassis and solenoid 95a controlling the motor to lower the chassis. The motor is controlled through a source of electricity such as the battery 96. A main switch 97 is provided in the circuit, this switch being normally closed to permit operation of the compensating mechanism. At 98 and 99 are indicated vertically spaced limit switches which are installed in the circuits and actuated by a part of the chassis at the upper or lower limits of its vertical adjustment for load compensation. These limit switches are operated to break the circuits to the motor and stop the motor at the points of maximum and minimum compensation for load when the car is over or under-loaded. At 100 and 101 are indicated tell-tale signal lights which may be positioned on the instrument panel of the vehicle to signal the driver when the compensator mechanism is operating. The lamp 100 is actuated when the solenoid 95 is in circuit and energized, and the lamp 101 is actuated when the solenoid 95a is energized.

In the embodiment herein illustrated the load compensating mechanism operates through separate torsion bars 53 to increase or decrease the spring resistance at the rear of the vehicle so as to compensate for varying loads and maintain the rear end of the vehicle at a substantially constant average riding height. In this embodiment when the vehicle is empty or without pay load, the load compensating torsion bars will preferably be initially placed under torsion or twisted an amount equal to the initial torsional twist given to each of the bars 43 but in the opposite direction. Thus, under initial or normal no-load conditions each compensating bar 53 balances out or offsets one of the bars 43 at each side of the vehicle, since they are preferably torsionally twisted equally in opposite directions, and hence the rear end of the vehicle is supported when empty at a given average or normal riding height by means of two of the torsion bars 43 at each side of the vehicle. When the vehicle is under approximately half load the compensating torsion bars 53 will have been untwisted to a point where they are substantially free of torsional deflection and at this time the rear end of the vehicle will be sprung by means of the six torsion bars 43. Under full load condition the torsion bars 53 will have been twisted or torsionally deflected in the same direction as the bars 43 and to an equal amount so that at this time the rear end of the vehicle will be sprung by means of eight torsion bars. From the foregoing it will be observed that the vehicle spring suspension may readily accommodate a pay load equal to the sprung weight of the vehicle while maintaining substantially a constant average riding height and a full normal axle to frame clearance under no-load and full load conditions.

Due to the load arms or levers 54 having constant lengths in the illustrated embodiment, a constant spring rate will be provided with, however, a variable ride frequency. In this embodiment, as in the case of the other embodiments, extremely soft springs may be utilized, since under no conditions is it necessary to utilize springs which are heavier than necessary to carry the sprung loads regardless of whether the vehicle is empty or fully loaded. For example, the effective average spring rate, utilizing the spring suspension of the present invention, can be as low as approximately thirty pounds per inch per wheel as compared with conventional spring suspensions, utilizing either leaf or coil springs or the combination thereof, necessitating spring rates as high as one hundred and ten pounds per inch per wheel.

In the illustrated embodiment it will be noted that additional spring torsion bars 43b are provided in the spring suspension, there being one at each side of the vehicle connected at one end to the wheel supporting arm 41 and at its opposite end at 52 to the center cross-frame member 49. These spring bars 43b, which may be conveniently termed elevation stabilizers or compensating springs for the front end of the frame or car, are introduced in the spring suspension for the purpose of compensating for varying load conditions and thus assuring average normal riding height for the front of the vehicle. Since extremely soft spring rates are possible at the front and rear wheels with the present torsion bar suspension, it is desirable to install additional springing at the front wheels in order to maintain a normal average riding height of the front end under conditions such as when the front end tends to dip after a rapid or severe brake application or when the front end tends to raise or elevate excessively during rapid acceleration of the vehicle. The elevation stabilizer torsion bars 43b under normal conditions may be in unstressed condition, i. e. free of torsional deflection, whereas the remaining torsion bars 43 of the clusters or sets would be normally deflected an amount sufficient to support the vehicle at the average riding height under no-load conditions. The stabilizer bars 43b would, therefore, be twisted in one direction or the other to resist elevation or lowering of the front end, as a result of rapid acceleration of the vehicle or sudden application of the brakes, and tend to maintain the desired average riding height at the front end. The bars 43b, on the other hand, may be initially twisted or deflected in one direction or the other when connected to brackets 52 so as to position the front end at the desired riding height. The bars 43b thus resist elevation, diving or dipping of the front end and assist in bringing the front end back to normal riding position.

An important feature of the present invention, in connection with one aspect thereof, resides in the provision of torsion bar spring means connecting corresponding front and rear wheels through levers which are properly selected and mounted so that the spring means will be responsive to vertical motion of the wheels thus connected. As a result, vertical forces of approximately the same magnitude will be applied to the chassis frame and body at the front and rear and in the same direction. Any number of torsion bars may be used to suit the particular vehicle. The torsion bar spring means or mechanism, whatever number of torsion bars is utilized, will preferably be selected as to size and torsional resiliency so as to support the sprung weight of the vehicle with the desired axle assembly to frame clearance. The number of torsion bars in the present embodiment is understood to be shown merely for illustrative purposes. It will be seen that with the use of these bars, which can be easily and cheaply supported along the frame, a very simple and effective spring suspension is provided which will afford a much smoother and more comfortable ride under varying load conditions. Although the present spring suspension may be used without the load compensating mechanism and vice versa, it is much preferred that they be employed conjointly since by so doing the widest advantages of the invention are thus ensured.

I claim:

1. In a spring suspension for a vehicle having front and rear longitudinally spaced wheels, a load carrying frame, lever means connected to each wheel and also connected to the frame at longitudinally spaced points, torsion bar spring means connecting said lever means and effective to transmit vertical forces in corresponding directions to the frame at said points in response to vertical motion of either wheel, and longitudinal torsion bar spring means connected to one lever means and independent of the other for increasing the spring resistance at one end of the frame thereby to compensate for varying load conditions, said lever means for the front and rear wheels extending transversely from the torsion bar spring means in opposite directions.

2. In a spring suspension for a vehicle having a frame and front and rear longitudinally spaced wheels at the same side of the frame, lever arm means connected to each wheel and also connected to the frame at longitudinally spaced localities, longitudinally torsion bar spring means connecting said lever arm means and effective to transmit vertical forces in corresponding directions to the front and rear of the frame in response to vertical motion of either wheel, and torsion bar spring means connected to one wheel and independent of the other for increasing the spring resistance at one end of the frame thereby to compensate for varying load conditions, said lever arm means for the front and rear wheels extending transversely from said longitudinal torsion bar spring means in opposed directions.

3. In a spring suspension for a vehicle having a frame and front and rear longitudinally spaced wheels at the same side of the frame, swinging lever arm means for the front wheel responsive to up and down movement thereof, swinging lever arm means for the rear wheel, axle means connected to the rear wheel and responsive to up and down movement thereof, a swinging member responsive to vertical motion of said axle means and connecting said axle means and said second named lever arm means and effective to swing the latter in response to vertical motion of the rear wheel, longitudinal torsion bar spring means common to said front and rear wheels and connecting said lever arm means, said lever arm means for the front and rear wheels extending transversely from said torsion bar spring means in opposed directions and effective to cause said spring means to transmit vertical forces in corresponding directions to the front and rear of the frame in response to vertical motion of either wheel, the connection between the lever arm means for the rear wheel and said spring means being spaced outwardly from the longitudinal center line of the vehicle a greater distance than the spacing outwardly from said center line of the connection between the lever arm means for the front wheel and said spring means.

4. In a spring suspension for a vehicle having a frame and front and rear wheels at a side of the frame, torsion bar spring means common to said front and rear wheels for supporting the frame on said wheels, means for transmitting the effort of said spring means to opposite ends of the frame so as to displace said ends in corresponding vertical directions in response to vertical motion of either a front wheel or a rear wheel, said transmitting means including swinging lever arm means attached to and extending transversely from said spring means in opposed directions, spring means connecting one of said wheels to the frame and being free of connection to the other wheel, and means connected to said last named spring means and operative independently of said first named spring means to vary the resistance of said second named spring means.

5. In a spring suspension for a vehicle having a frame and front and rear wheels at a side of the frame, front and rear swinging lever arms pivotally connected to the frame and connected to said wheels, torsion bar spring means common to said wheels and connected to said front and rear lever arms at the localities of the pivotal connections thereof to the frame and operative by said lever arms to displace opposite ends of the frame in corresponding directions upon vertical motion of a front wheel or a rear wheel, said lever arms extending from said pivotal connections in opposed directions, and additional torsion bar spring means connected to one wheel adjacent one end of the frame and being independent of the other wheel and operative to increase the spring resistance at said end of the frame.

6. In a spring suspension for a vehicle having a frame and front and rear wheels at a side of the frame, front and rear swinging lever arms pivotally connected to the frame and connected to said wheels, spring means extending continuously between and connected to said front and rear lever arms at the localities of the pivotal connections thereof to the frame and operative by said lever arms to displace opposite ends of the frame in corresponding directions upon vertical motion of a front wheel or a rear wheel, said lever arms extending from said pivotal connections in opposed directions, and additional spring means connected to one of said wheels adjacent one end of the frame and being independent of the lever arm for the other wheel and operative to increase the spring resistance at said end of the frame, the connection between the rear lever arm and said first named spring means being spaced outwardly from the longitudinal center line of the vehicle a greater distance than the spacing outwardly from said center line of the connection between the front lever arm and said first named spring means.

7. In a spring suspension for a vehicle having a frame and front and rear wheels at a side of the frame, spring means common to and interposed between said wheels, lever arm means connected to the frame adjacent the front and rear thereof and connected to said spring means at longitudinally spaced points for simultaneously imparting vertical forces in corresponding directions adjacent the front and rear of the frame in response to vertical motion of either a front or a rear wheel, said lever arm means extending transversely from said spring means in opposed directions, torsion bar spring means connected to one wheel and being independent of the other, and means responsive to changes in static load on the frame for varying the effective resistance of said torsion bar spring means.

8. In a vehicle having a frame and two longitudinally spaced wheels at a side of the frame, torsion bar spring means extending longitudinally of the frame for yieldingly supporting the frame on said wheels, lever arm means connected to said frame and to said spring means adjacent each of said wheels and responsive to vertical displacement thereof to deflect said spring means and thereby simultaneously impart vertical forces in the same direction to opposite ends of the frame, said lever arm means for said wheels extending transversely from said spring means in opposed directions, and spring means connected to one of said wheels and independent of the other for increasing the spring resistance at one end of the frame.

9. In a spring suspension for a vehicle having a frame and front and rear longitudinally spaced wheels at a side of the frame, swinging lever arm means connected to each wheel and also pivotally connected to the frame at longitudinally spaced points, said lever arm means for the wheels extending in opposed directions from the pivotal connections thereof with the frame, torsion bar spring means connecting said lever arm means and effective to transmit vertical forces in corresponding directions to the frame at said points in response to vertical motion of either wheel, longitudinal torsion bar spring means connected to one lever arm means and operative independently of the other for increasing the spring resistance at one end of the frame thereby to compensate for varying load conditions, and means for torsionally deflecting said second named spring means.

10. In a vehicle having a frame and front and rear wheels at the same side of the frame, a swinging lever arm for a rear wheel pivotally connected to the frame and extending in its length transversely of the frame, axle means connected to said rear wheel, a longitudinal member connecting said axle means and lever arm for imparting swinging motion thereto, a transversely extending swinging lever arm for said front wheel pivotally connected to the frame and extending therefrom oppositely to said first named lever arm, a spring suspension extending between and connected to said lever arms and operative in conjunction therewith to simultaneously transmit vertical forces in corresponding directions at opposite ends of the frame upon independent vertical displacement of either wheel, a torsion bar spring means connecting one lever arm with the frame and being independent of the other lever arm, and means for varying the effective resistance of said torsion bar spring means.

11. In a vehicle having a frame and front and rear wheels at the same side of the frame, a swinging lever arm connected to the rear wheel and swingable in response to vertical displacement thereof, a swinging lever arm connected to the front wheel and swingable in response to vertical displacement thereof, a spring suspension extending between and connected to said lever arms at one side of the frame, said lever arms extending from said spring suspension in opposed directions and operative in conjunction therewith to simultaneously transmit vertical forces in corresponding directions at opposite ends of the frame upon independent vertical displacement of either wheel, additional spring means connected to one wheel and operative independently of the other wheel, and means operative by a change in load on the frame for deflecting said last named spring means, the connection between the lever arm for the rear wheel and said spring suspension being spaced outwardly from the longitudinal center line of the vehicle a greater distance than the spacing outwardly from said center line of the connection between the lever arm for the front wheel and said spring suspension.

12. In a vehicle having a frame and front and rear wheels at the same side of the frame, a swinging lever arm connected to the rear wheel and swingable in response to vertical displacement thereof, a swinging lever arm connected to the front wheel and swingable in response to vertical displacement thereof, a torsion bar spring suspension extending between and connected to said lever arms at one side of the frame, said lever arms extending from said spring suspension in opposed directions and operative in conjunction therewith to simultaneously transmit vertical forces in corresponding directions at opposite ends of the frame upon independent vertical displacement of either wheel, additional torsion bar spring means connected to one wheel and operative independently of the other wheel, and power operated means operative independently of said spring suspension to increase or decrease the resistance of said last named spring means in response to changes in load on the frame.

13. In a vehicle having longitudinally spaced wheels and a frame supported thereon, said frame including a rigid swinging member, a torsion bar spring suspension common to and responsive to vertical motion of a longitudinally spaced pair of wheels at the same side of the frame, a torsion bar connecting one wheel and the frame and operative independently of the other wheel, the connection between said torsion bar and said one wheel including a swinging lever arm extending in its length transversely of the frame inwardly from said torsion bar and connected to said swinging member, and means responsive to a change in load on the frame and operative independently of said suspension for varying the effective resistance of said torsion bar.

14. In a spring suspension for a vehicle having front and rear wheels and a load carrying frame, a swinging lever arm pivoted to the frame and connected to a front wheel at one side of the frame, a swinging lever arm pivoted to the frame and connected to a rear wheel at the same side of the frame, said lever arms extending in their lengths transversely of the frame and in opposed direction from the pivotal axes thereof and swinging in response to vertical displacement of said wheels, a plurality of spring torsion bars collectively attached adjacent opposite ends to said lever arms at the pivotal axes thereof and subject to torsional deflection in response to swinging motion of either lever arm, a spring torsion bar connected to one lever arm independently of the other lever arm, and means for varying the effective resistance of said last named torsion bar in response to changes in static load on the frame.

15. In a spring suspension for a vehicle having front and rear wheels and a load carrying frame, torsion bar spring means extending between a front and a rear wheel at the same side of the frame, a swinging lever arm directly attached at one end to said torsion bar spring means adjacent the front of the frame and connected at its opposite end to the front wheel, a swinging lever arm directly attached at one end to said torsion bar spring means adjacent the rear of the frame, means for pivotally connecting each lever arm to the frame at the locality of the attachment thereof to said spring means, means for connecting said second named lever arm to the rear wheel, said lever arms extending from said spring means in opposed directions whereby vertical displacement of each wheel will swing one of the lever arms to torsionally deflect the torsion bar spring means and cause forces to be exerted in corresponding vertical directions on the frame at or adjacent the points of pivotal connection of said lever arms to the frame, a torsion bar spring connected to one wheel and free of connection to the other wheel, and means for varying the effective resistance of said torsion bar spring in response to changes in static load on the frame.

16. In a vehicle as set forth in claim 8, power operated means responsive to changes in elevation of an end of the frame for varying the resistance of said last named spring means.

17. In a spring suspension as set forth in claim 2, power operated means responsive to changes in elevation of an end of the frame for varying the resistance of said second named torsion bar spring means.

18. In a vehicle as set forth in claim 8, an electrically operated motor responsive to changes in elevation of an end of the frame and operatively connected to said last named spring means for torsionally deflecting the same to vary the resistance thereof.

19. In a spring suspension for a vehicle having a frame and a pair of front and rear wheels at each side of the frame, front and rear lever arm means pivotally connected to the frame and connected to the wheels of each pair, torsional spring means extending longitudinally between and connected to the front and rear lever arm means for each pair of wheels and operative by said lever arm means to displace opposite ends of the frame in corresponding directions upon vertical motion of a front wheel or a rear wheel of a pair of said wheels, said torsional spring means for the pairs of front and rear wheels diverging outwardly toward the rear of the vehicle and the connection between each rear lever arm means and its associated spring means being spaced outwardly from the longitudinal center line of the vehicle a greater distance than the spacing outwardly from said center line of the connection between the front lever arm means at the same side of the vehicle and its associated spring means, additional spring means connected to a wheel of each of said pairs and being independent of the other wheels, and power actuated means operatively connected to said additional spring means for varying the resistance thereof to vertical displacement of the frame.

WILLIAM D. ALLISON.

REFERENCES CITED

The following references are of record in the file of this patent:

UNITED STATES PATENTS

| Number | Name | Date |
|---|---|---|
| 1,396,549 | Beatty | Nov. 8, 1921 |
| 2,083,381 | Hutchison, Jr. | June 8, 1937 |
| 2,191,211 | Krotz | Feb. 20, 1940 |

FOREIGN PATENTS

| Number | Country | Date |
|---|---|---|
| 182,233 | Switzerland | Jan. 31, 1936 |